US007353172B2

(12) United States Patent
Emonts et al.

(10) Patent No.: US 7,353,172 B2
(45) Date of Patent: *Apr. 1, 2008

(54) SYSTEM AND METHOD FOR CANTONESE SPEECH RECOGNITION USING AN OPTIMIZED PHONE SET

(75) Inventors: Michael Emonts, San Jose, CA (US); Xavier Menendez-Pidal, Los Gatos, CA (US); Lex Olorenshaw, Half Moon Bay, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 832 days.

This patent is subject to a terminal disclaimer.

(21) Appl. No.: 10/395,352

(22) Filed: Mar. 24, 2003

(65) Prior Publication Data

US 2004/0193418 A1 Sep. 30, 2004

(51) Int. Cl.
*G10L 15/00* (2006.01)
*G10L 15/04* (2006.01)
*G10L 15/14* (2006.01)
*G10L 15/18* (2006.01)
*G10L 17/00* (2006.01)

(52) U.S. Cl. .............. 704/254; 704/244; 704/248; 704/256.1; 704/256.2; 704/257

(58) Field of Classification Search .......... 704/251, 704/253, 254, 256.1, 256.2
See application file for complete search history.

(56) References Cited

U.S. PATENT DOCUMENTS

| 4,370,521 | A | * | 1/1983 | Johnston et al. | 704/253 |
| 5,220,639 | A | * | 6/1993 | Lee | 704/200 |
| 5,581,655 | A | * | 12/1996 | Cohen et al. | 704/245 |
| 5,680,510 | A | * | 10/1997 | Hon et al. | 704/255 |
| 5,751,905 | A | * | 5/1998 | Chen et al. | 704/254 |
| 5,758,319 | A | * | 5/1998 | Knittle | 704/251 |
| 5,884,261 | A | * | 3/1999 | de Souza et al. | 704/255 |

(Continued)

FOREIGN PATENT DOCUMENTS

| EP | 71716 A2 | * | 2/1983 |
| JP | 01066790 A | * | 3/1989 |

OTHER PUBLICATIONS

A Phonetic Transcription System of Arabic Text Hany Selim, Taghrid Anbar IEEE Acoustics, Speech and Signal Processing ICASSP-87 vol. 12 Apr. 1987 pp. 1446-1449.*

(Continued)

*Primary Examiner*—Richemond Dorvil
*Assistant Examiner*—Dorothy S Siedler
(74) *Attorney, Agent, or Firm*—Gregory J. Koerner; Redwood Patent Law

(57) ABSTRACT

The present invention comprises a system and method for implementing a Cantonese speech recognizer with an optimized phone set, and may include a recognizer configured to compare input speech data to phone strings from a vocabulary dictionary that is implemented according to an optimized Cantonese phone set. The optimized Cantonese phone set may be implemented with a phonetic technique to separately include consonantal phones and vocalic phones. For reasons of system efficiency, the optimized Cantonese phone set may preferably be implemented in a compact manner to include only a minimum required number of consonantal phones and vocalic phones to accurately represent Cantonese speech during the speech recognition procedure.

43 Claims, 9 Drawing Sheets

| | |
|---|---|
| b | aa |
| d | i |
| g | u |
| p | e |
| t | o |
| k | yu |
| m | oe |
| n | eo |
| ng | a |
| f | eu |
| l | aai |
| h | aau |
| z | ai |
| c | au |
| s | ei |
| w | oi |
| j | ou |
| cl | eoi |
| sil | ui |
| | iu |

610  Optimized Cantonese Phone Set

U.S. PATENT DOCUMENTS 6,067,520 A * 5/2000 Lee .............................. 704/270
6,553,342 B1 * 4/2003 Zhang et al. ................ 704/255
7,181,391 B1 * 2/2007 Jia et al. ...................... 704/231

OTHER PUBLICATIONS

"A New Framework for Recognition of Mandarin Syllables with Tones Using Sub-Syllabic Units" Chih-Heng Lin, Lin-Shan Lee, Pei-Yih Ting IEEE Acoustics, Speech and Signal Processing ICASSP-93 vol. 2 Apr. 27-30, 1993 pp. 227-230.*

Phonetically Guided Clustering for Isolated Word Recognition D. Mergel, H. Ney IEEE Acoustics, Speech and Signal Processing ICASSP-85 vol. 10 Apr. 1985 pp. 854-857.*

"Vocabulary Optimization Based on Perplexity" Kyuwoong Hwang IEEE Acoustics, Speech and Signal Processing ICASSP-97 vol. 2 Apr. 21-24, 1997 pp. 1419-1422.*

Discrete Time Speech Signal Processing, Thomas E. Quatieri 2002 Prentice Hall PTR, Prentice Hall, Inc. Upper Saddle River, NJ 07458 Chapter 3 Section 3.4.6 pp. 92-102.*

Earok et al, "A Quantitative Assessment of the Relative Speaker Discriminating Properties of Phonemes", IEEE International Conference on Acoustics, Speech, and Signal Processing, ICASSP-94, vol. 1, Apr. 19-22, 1994, pp. I-133-I-136.*

Zhang, J.S., "A Hybrid Approach to Enhance Task Portability of Acoustic Models in Chinese Speech Recognition", in Proc. Eurospeech, vol. 3, 2001, pp. 1661-1663.*

Lee, L.S., "Golden Mandarin(I)-A Real-Time Mandarin SPeech Dictation Machine for Chinese Language with Very Large Vocabulary", IEEE Transactions on Speech and Audio Processing, vol. 1, No. 2, Apr. 1993, pp. 158-179.*

* cited by examiner

| | |
|---|---|
| b | aa |
| d | i |
| g | u |
| p | e |
| t | o |
| k | yu |
| m | oe |
| n | eo |
| ng | a |
| f | eu |
| l | aai |
| h | aau |
| z | ai |
| c | au |
| s | ei |
| w | oi |
| j | ou |
| cl | eoi |
| sil | ui |
| | iu |

610         Optimized Cantonese Phone Set

FIG. 6

| CONTEXT | ACTION |
|---|---|
| Syllable-Initial | Use Consonant Only (No Initial Closure) |
| Syllable-Final/Midphrase | Use Consonant Only (No Initial Closure) |
| Syllable-Final/Phrase-End | Use Closure Only ( No Release) (p/t/k not differentiated) |

910

Stops

SYSTEM AND METHOD FOR CANTONESE SPEECH RECOGNITION USING AN OPTIMIZED PHONE SET

BACKGROUND SECTION

1. Field of the Invention

This invention relates generally to electronic speech recognition systems, and relates more particularly to a system and method for Cantonese speech recognition using an optimized phone set.

2. Description of the Background Art

Implementing a robust and efficient method for system users to interface with electronic devices is a significant consideration of system designers and manufacturers. Voice-controlled operation of electronic devices is a desirable interface for many system users. For example, voice-controlled operation allows a user to perform other tasks simultaneously. For instance, a person may operate a vehicle and operate an electronic organizer by voice control at the same time. Hands-free operation of electronic systems may also be desirable for users who have physical limitations or other special requirements.

Hands-free operation of electronic devices may be implemented by various speech-activated electronic systems. Speech-activated electronic systems thus advantageously allow users to interface with electronic devices in situations where it would be inconvenient or potentially hazardous to utilize a traditional input device. Electronic entertainment systems may also utilize speech recognition techniques to allow users to interact with a system by speaking to it.

However, effectively implementing such systems may create substantial challenges for system designers. For example, enhanced demands for increased system functionality and performance may require more system processing power and require additional hardware resources. An increase in processing or hardware requirements may also result in a corresponding detrimental economic impact due to increased production costs and operational inefficiencies.

Furthermore, enhanced system capability to perform various advanced operations may provide additional benefits to a system user, but may also place increased demands on the control and management of various system components. For example, an enhanced electronic system that effectively recognizes words and phrases in the Cantonese language may benefit from an efficient implementation because of the large amount and complexity of the digital data involved. Therefore, for all the foregoing reasons, implementing a robust and efficient method for a system user to interface with electronic devices remains a significant consideration of system designers and manufacturers.

SUMMARY

In accordance with the present invention, a system and method are disclosed for implementing a Cantonese speech recognizer with an optimized phone set. In one embodiment, a recognizer may be configured to compare input speech data to phone strings from a vocabulary dictionary that is implemented according to an optimized Cantonese phone set. The optimized Cantonese phone set may be implemented with a sub-syllabic phonetic technique to separately include consonantal phones and vocalic phones. For reasons of system efficiency, the optimized Cantonese phone set may preferably be implemented in a compact manner to include only a minimum required number of consonantal phones and vocalic phones to accurately represent Cantonese speech during the speech recognition procedure.

In certain embodiments, the optimized Cantonese phone set may include the following consonantal phones: b, d, g, p, t, k, m, n, ng, f, l, h, z, c, s, w, and j. In addition, the optimized Cantonese phone set may also include the following vocalic phones: aa, i, u, e, o, yu, oe, eo, a, eu, aai, aau, ai, au, ei, oi, ou, eoi, ui, and iu. In many embodiments, the optimized Cantonese phone set may also include a closure phone "cl" and a silence phone "sil". Because of the relatively small number of phones used, the optimized Cantonese phone set therefore provides an efficient and compact representation of phones for accurately recognizing Cantonese speech.

In certain embodiments, the optimized Cantonese phone set may advantageously represent diphthongs by utilizing a single unified diphthong phone. For example, the optimized Cantonese phone set may include the following unified diphthong phones: eu, aai, aau, ai, au, ei, oi, ou, eoi, ui, and iu. In addition, in the Cantonese language, lip rounding sounds may typically occur in conjunction with a "g" sound or with a "k" sound. In certain embodiments, the optimized Cantonese phone set may efficiently represent lip rounding by utilizing a separate lip rounding phone "w" which is already present in the Cantonese phone set.

Furthermore, in the Cantonese language, "stops" may preferably be associated primarily with sounds corresponding to "b", "d", "g", "p", "t", and "k". In accordance with the present invention, the optimized Cantonese phone set may advantageously utilize two different techniques to represent "b", "d", "g", "p", "t", and "k", depending upon the context of the corresponding sound within a phrase. In a syllable-initial context in which a stop is located at the beginning of a syllable, the optimized Cantonese phone set may utilize an appropriate consonant phone ("b", "d", "g", "p", "t", or "k") in the syllable-initial context to represent both the consonant and a preceding closure.

In addition, in a syllable-final/midphrase context in which a stop is located at the end of a word in the middle of a phrase, the optimized Cantonese phone set may utilize an appropriate phone ("p", "t", or "k") in the syllable-final/midphrase context to represent both the consonant and the preceding closure. Furthermore, in a syllable-final/phrase-end context in which a stop is located at the end of a word at the end of a phrase, the optimized Cantonese phone set may effectively utilize the same identical closure phone "cl" in the syllable-final/phrase-end context to represent either "p", "t", or "k" as a closure only, without any subsequent releasing consonant sound. The present invention thus provides an effective system and method for implementing a Cantonese speech recognizer with an optimized phone set.

BRIEF DESCRIPTION OF THE DRAWINGS

FIG. 6 is a diagram of an optimized Cantonese phone set, in accordance with one embodiment of the present invention;

FIG. 9 is a diagram illustrating a technique for handling stops, in accordance with one embodiment of the present invention.

DETAILED DESCRIPTION

The present invention relates to an improvement in speech recognition systems. The following description is presented to enable one of ordinary skill in the art to make and use the invention and is provided in the context of a patent application and its requirements. Various modifications to the preferred embodiments will be readily apparent to those skilled in the art, and the generic principles herein may be applied to other embodiments. Thus, the present invention is not intended to be limited to the embodiments shown, but is to be accorded the widest scope consistent with the principles and features described herein.

The present invention comprises a system and method for implementing a Cantonese speech recognizer with an optimized phone set, and may include a recognizer configured to compare input speech data to phone strings from a vocabulary dictionary that is implemented according to an optimized Cantonese phone set. The optimized Cantonese phone set may be implemented with a sub-syllabic phonetic technique to separately include consonantal phones and vocalic phones. For reasons of system efficiency, the optimized Cantonese phone set may preferably be implemented in a compact manner to include only a minimum required number of consonantal phones and vocalic phones needed to accurately represent Cantonese speech during the speech recognition procedure.

Figure 1:
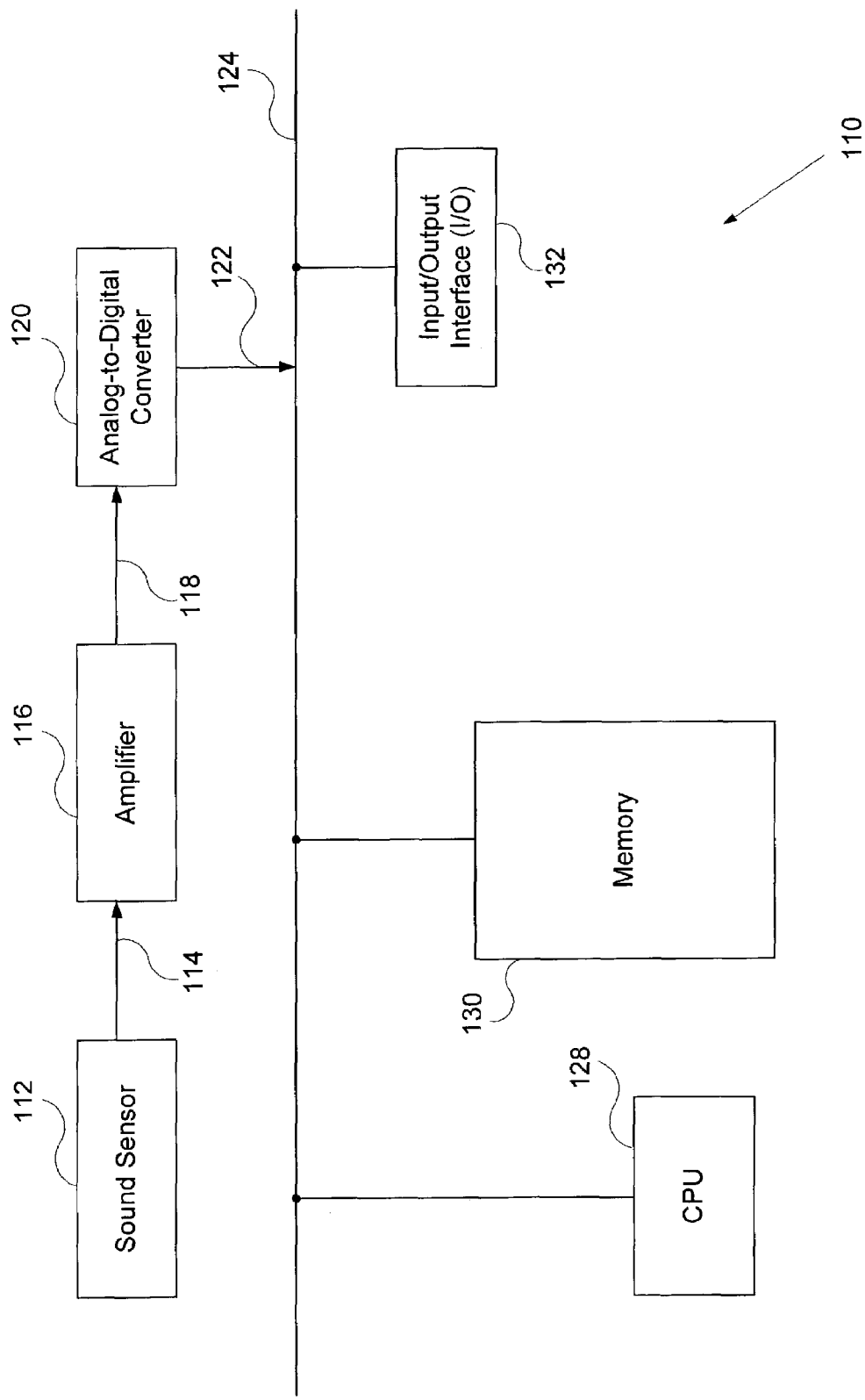
FIG. 1 is a block diagram for one embodiment of a computer system, in accordance with the present invention.

Referring now to FIG. 1, a block diagram for one embodiment of a computer system 110 is shown, according to the present invention. The FIG. 1 embodiment includes a sound sensor 112, an amplifier 116, an analog-to-digital converter 120, a central processing unit (CPU) 128, a memory 130, and an input/output interface 132. In alternate embodiments, computer system 110 may readily include various other elements or functionalities in addition to, or instead of, those elements or functionalities discussed in conjunction with the FIG. 1 embodiment.

Sound sensor 112 detects sound energy and converts the detected sound energy into an analog speech signal that is provided via line 114 to amplifier 116. Amplifier 116 amplifies the received analog speech signal and provides the amplified analog speech signal to analog-to-digital converter 120 via line 118. Analog-to-digital converter 120 then converts the amplified analog speech signal into corresponding digital speech data. Analog-to-digital converter 120 then provides the digital speech data via line 122 to system bus 124.

CPU 128 may then access the digital speech data on system bus 124 and responsively analyze and process the digital speech data to perform speech detection according to software instructions contained in memory 130. The operation of CPU 128 and the software instructions in memory 130 are further discussed below in conjunction with FIGS. 2-7. After the speech data is processed, CPU 128 may then provide the results of the speech detection analysis to other devices (not shown) via input/output interface 132. In alternate embodiments, the present invention may readily be embodied in various devices other than the computer system 110 shown in FIG. 1.

Figure 2:
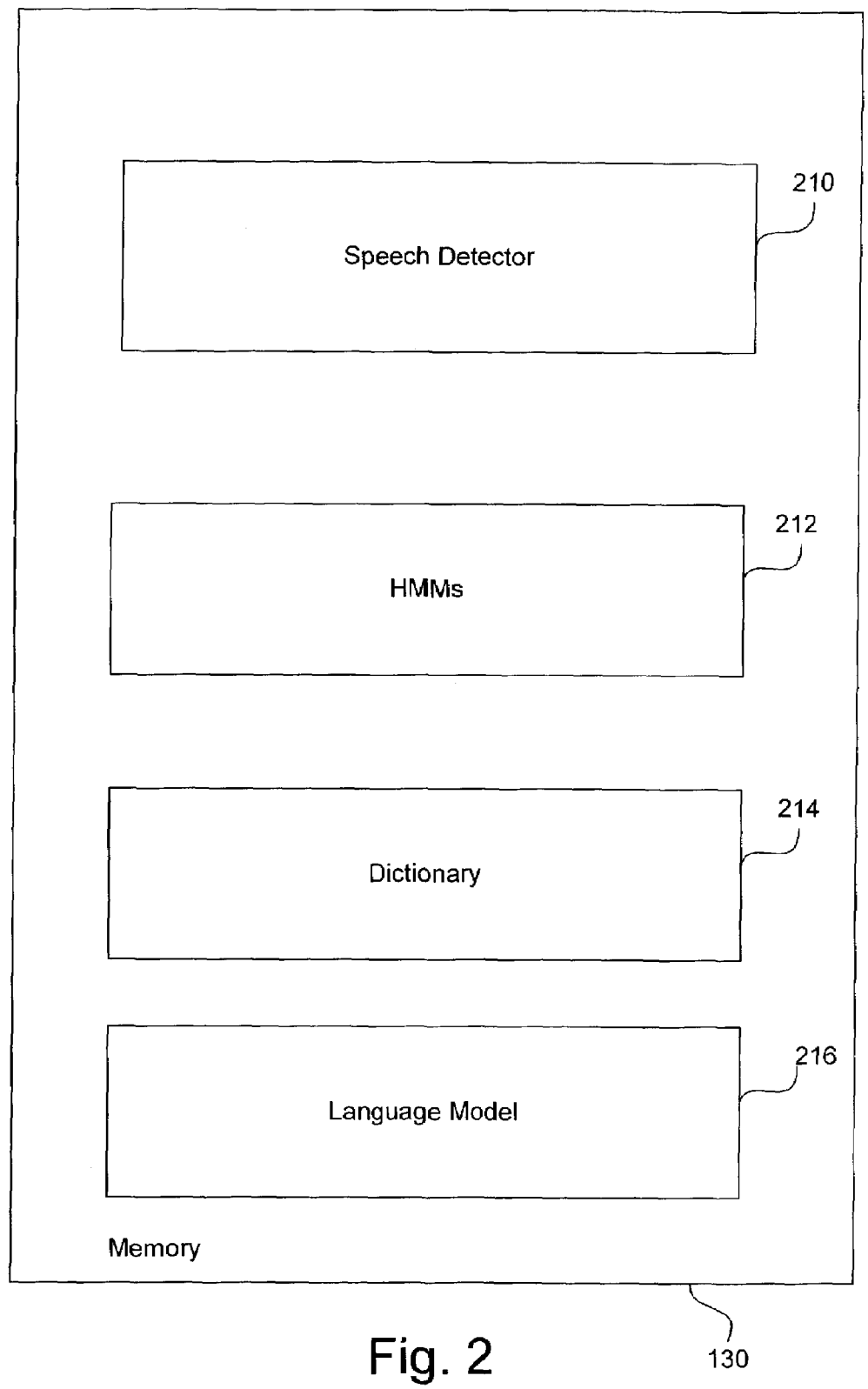
FIG. 2 is a block diagram for one embodiment of the memory of FIG. 1, in accordance with the present invention.

Referring now to FIG. 2, a block diagram for one embodiment of the memory 130 of FIG. 1 is shown, according to the present invention. Memory 130 may alternately comprise various storage-device configurations, including random access memory (RAM) and storage devices such as floppy discs or hard disc drives. In the FIG. 2 embodiment, memory 130 includes, but is not limited to, a speech detector 210, Hidden Markov Models (HMMs) 212, a vocabulary dictionary 214, and a language model 216. In alternate embodiments, memory 130 may readily include various other elements or functionalities in addition to, or instead of, those elements or functionalities discussed in conjunction with the FIG. 2 embodiment.

In the FIG. 2 embodiment, speech detector 210 includes a series of software modules that are executed by CPU 128 to analyze and recognize speech data, and which are further described below in conjunction with FIG. 3. In alternate embodiments, speech detector 210 may readily be implemented using various other software and/or hardware configurations. HMMs 212 and dictionary 214 may be utilized by speech detector 210 to implement the speech recognition functions of the present invention. One embodiment for HMMs 212 is further discussed below in conjunction with FIG. 4, and one embodiment for dictionary 214 is further discussed below in conjunction with FIG. 5. Language model 216 may include a word sequence or "syntax" model that predicts a next word light of previous words.

Figure 3:
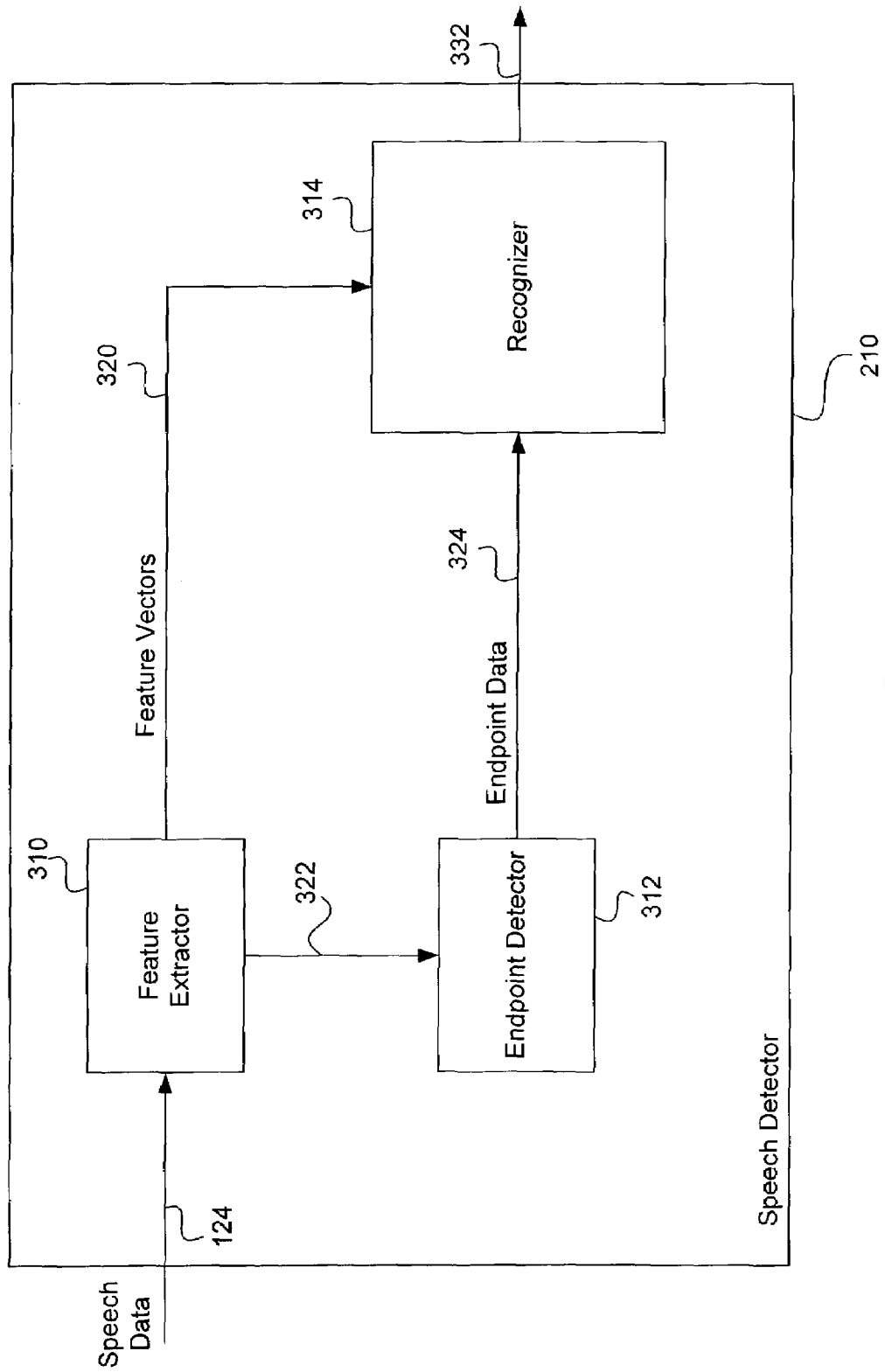
FIG. 3 is a block diagram for one embodiment of the speech detector of FIG. 2, in accordance with the present invention.

Referring now to FIG. 3, a block diagram for one embodiment of the speech detector 210 of FIG. 2 is shown, according to the present invention. Speech detector 210 includes, but is not limited to, a feature extractor 310, an endpoint detector 312, and a recognizer 314. In alternate embodiments, speech detector 210 may readily include various other elements or functionalities in addition to, or instead of, those elements or functionalities discussed in conjunction with the FIG. 3 embodiment.

In the FIG. 3 embodiment, an analog-to-digital converter 120 (FIG. 1) provides digital speech data to feature extractor 310 via system bus 124. Feature extractor 310 responsively generates feature vectors, which are provided to recognizer 314 via path 320. Feature extractor 310 further responsively generates speech energy to endpoint detector 312 via path 322. Endpoint detector 312 analyzes the speech energy and responsively determines endpoints of an utterance represented by the speech energy. The endpoints indicate the beginning and end of the utterance in time. Endpoint detector 312 then provides the endpoints to recognizer 314 via path 324.

Recognizer 314 is preferably configured to recognize words in a predetermined vocabulary which is represented in dictionary 214 (FIG. 2)0. The foregoing vocabulary words in dictionary 214 may correspond to any desired commands, instructions, or other communications for computer system 110. Recognized vocabulary words or commands may then be output to system 110 via path 332.

In practice, each word from dictionary 214 may be associated with a corresponding phone string (string of individual phones) which represents that word. Hidden Markov Models (HMMs) 212 (FIG. 2) may include trained stochastic representations for each of the phones from a pre-determined phone set that may effectively be utilized to represent the words in dictionary 214. Recognizer 314 may then compare input feature vectors from line 320 with appropriate HMMs 212 for each of the phone strings from dictionary 214 to determine which word produces the highest recognition score. The word corresponding to the highest recognition score may thus be identified as the recognized word.

Figure 4:
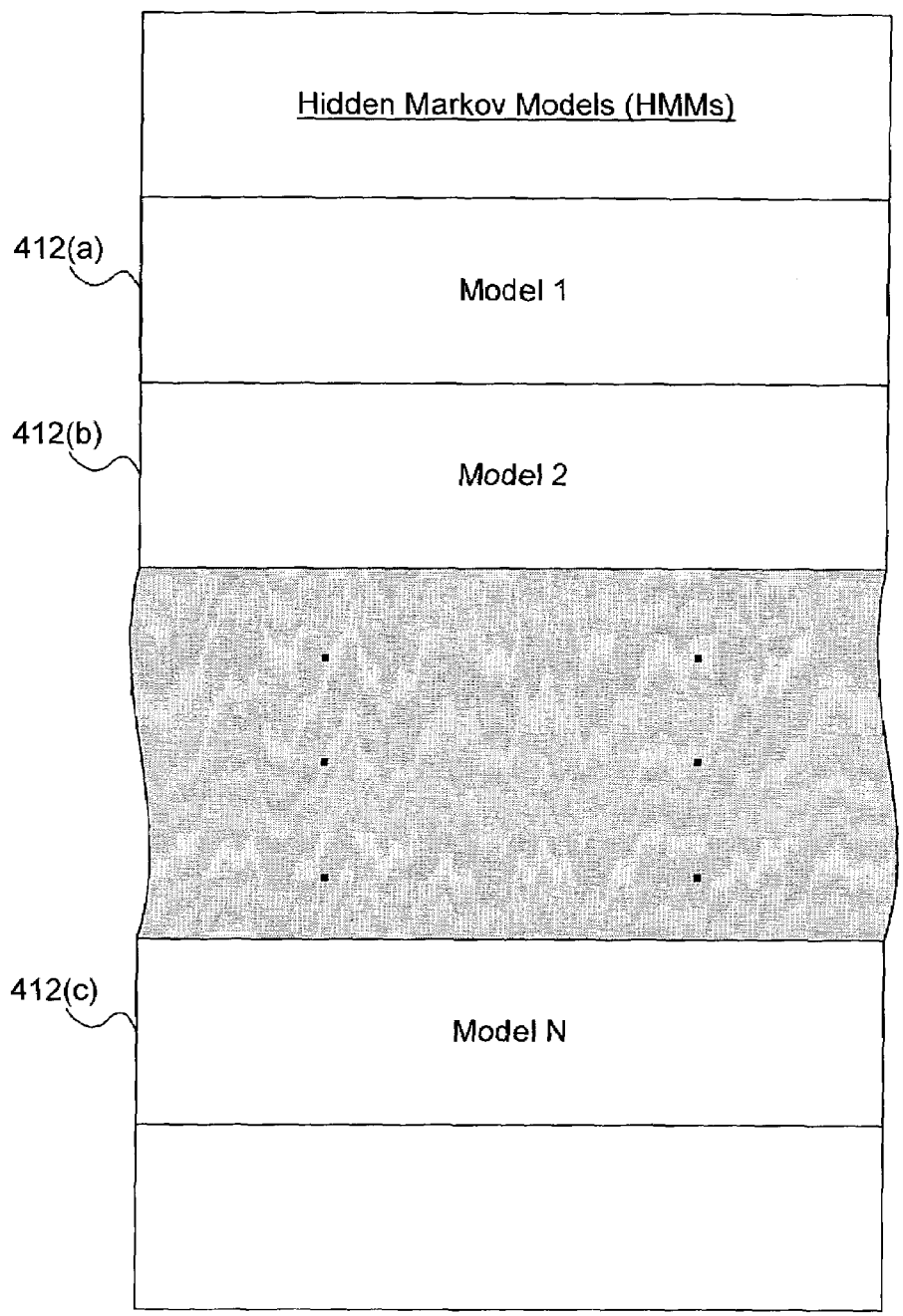
FIG. 4 is a diagram for one embodiment of the Hidden Markov Models of FIG. 2, in accordance with the present invention.

Referring now to FIG. 4, a block diagram for one embodiment of the HMMs 212 of FIG. 2 is shown, according to the present invention. In the FIG. 4 embodiment, HMMs 212 may preferably include a model 1 (412(a)) through a model N (412(c)). In alternate embodiments, HMMs 212 may readily include various other elements or functionalities in addition to, or instead of, those elements or functionalities discussed in conjunction with the FIG. 4 embodiment.

In the FIG. 4 embodiment, HMMs 212 may readily be implemented to include any desired number of models 412 that may include any required type of information. In the FIG. 5 embodiment, each model 412 from HMMs 212 may correspond to a different particular phone from a pre-determined phone set for use with recognizer 314 (FIG. 3). One embodiment of an optimized Cantonese phone set is further discussed below in conjunction with FIGS. 6-9.

Figure 5:
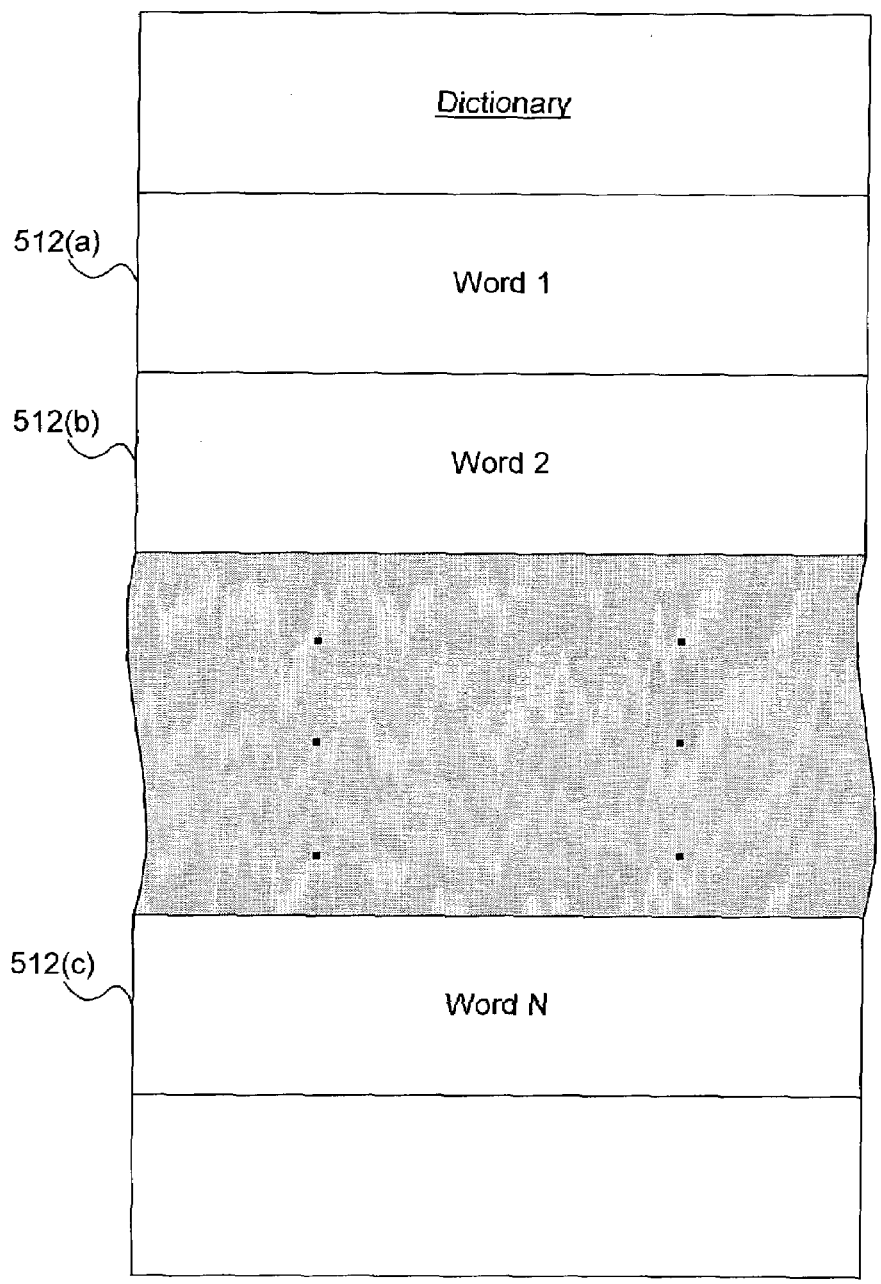
FIG. 5 is a diagram of one embodiment of the dictionary of FIG. 2, in accordance with the present invention.

Referring now to FIG. 5, a block diagram of the dictionary 214 of FIG. 2 is shown, in accordance with one embodiment of the present invention. In the FIG. 5 embodiment, dictionary 214 may preferably include a word 1 (512(a)) through a word N (512(c)). In alternate embodiments, dictionary 214 may readily include various other elements or functionalities in addition to, or instead of, those elements or functionalities discussed in conjunction with the FIG. 5 embodiment.

In the FIG. 5 embodiment, dictionary 214 may readily be implemented to include any desired number of words 512 that may include any required type of information. In the FIG. 5 embodiment, as discussed above in conjunction with FIG. 3, each word 512 from dictionary 214 may also include a corresponding phone string of individual phones from a pre-determined phone set. The individual phones of the foregoing phone string preferably form a sequential representation of the pronunciation of a corresponding word from dictionary 214. One embodiment of an optimized Cantonese phone set is further discussed below in conjunction with FIGS. 6-9.

Referring now to FIG. 6, a diagram of an optimized Cantonese phone set 610 is shown, in accordance with one embodiment of the present invention. In alternate embodiments, the present invention may readily perform speech recognition using various other elements or functionalities in addition to, or instead of, those elements or functionalities discussed in conjunction with the FIG. 6 embodiment.

In the FIG. 6 embodiment, phone set 610 includes thirty-nine separate phones that are presented here as seventeen consonantal phones plus a closure phone "cl" and a silence phone "sil" (all shown on the left side of FIG. 6) and twenty vocalic phones including a set of diphthongs (all shown on the right side of FIG. 6). In the FIG. 6 embodiment, phone set 610 is implemented to represent phonetic sounds from the Cantonese language of southern China.

Since Cantonese is typically written using Chinese characters instead of the Roman alphabet, the FIG. 6 phone set 610 (with the exception of a closure phone "cl" and a silence phone "sil") is presented by utilizing a Cantonese romanization scheme known as "jyutping" which has been developed by The Linguistic Society of Hong Kong (LSHK). Further information regarding "jyutping" and the Linguistic Society of Hong Kong may be found on the World Wide Web at cpct91.cityu.edu.hk/lshk. In alternate embodiments, the present invention may utilize optimized Cantonese phone sets that are represented in various other types of romanization schemes.

In the FIG. 6 embodiment, phone set 610 includes the following consonantal phones: b, d, g, p, t, k, m, n, ng, f, l, h, z, c, s, w, and j. In addition, phone set 610 also includes the following vocalic phones: aa, i, u, e, o, yu, oe, eo, a, eu, aai, aau, ai, au, ei, oi, ou, eoi, ui, and iu. In the FIG. 6 embodiment, phone set 610 also includes a closure phone "cl" and a silence phone "sil". Because of the relatively small number of phones used, phone set 610 therefore provides an efficient and compact representation of phones for accurately recognizing Cantonese speech.

The reduced number of separate phones in phone set 610 provides significant conservation of processing resources and memory in electronic system 110. In addition, the reduced number of total phones substantially decreases the burden associated with training Hidden Markov Models (HMMs) 212. However, in various alternate embodiments, the present invention may be implemented to include various additional or different phones than those shown in the FIG. 6 embodiment.

Conventional Chinese speech recognition systems typically utilize a phone set which is implemented with a sub-syllabic approach in which each syllables are represented as rimes or half-syllables. In contrast, the optimized Cantonese phone set 610 of the present invention advantageously utilizes a sub-syllabic phonetic technique in which syllables are further divided into sub-units that may be represented by combinations of appropriate consonantal phones and vocalic phones to provide greater granularity to the speech representation process. Furthermore, phone set 610 represents the various sounds of the Cantonese language without utilizing corresponding tonal information as part of the different phones. In addition to providing greater flexibility, the foregoing phonetic technique also has the additional benefit of requiring fewer total phones in phone set 610.

The phone set 610 of FIG. 6 may be organized into various linguistic categories depending upon characteristics of the corresponding phones. For purposes of illustration, one such organization is presented below as Table I which includes categories on the left with corresponding phones from phone set 610 on the right. In alternate embodiments, phone set 610 may be organized in various ways that are different than that shown in Table I.

TABLE I

| | |
|---|---|
| non-boundary single-state: | sil, cl |
| consonant | b, d, g, p, t k m n ng f l h z c s w j |
| unaspirated-consonant | b d g m n ng f l h z s w j |
| aspirated-consonant | p t k c |
| consonantal | b d g p t k m n ng f h z c s |
| unaspirated-consonantal | b d g m n ng f h z s |
| labial | b p m f w |
| alveolar | d t n l z c s |
| velar | g k ng |
| glide | w j |
| obstruent | b d g p t k f h z c s |
| unaspirated-obstruent | b d g f h z s |
| sonorant | m n ng l w j aa i u e o yu oe eo a eu aai aau ai au ei oi ou eoi ui iu |
| continuant | f l h s w j |
| strident | z c s |
| nasal | m n ng |
| fricative | f h s |
| approximant | l w j |
| affricate | z c |
| stop | b d g p t k |

TABLE I-continued

| | |
|---|---|
| aspirated-stop | p t k |
| unaspirated-stop | b d g |
| anterior | b d p t m n f l z c s |
| coronal | d t n l z c |
| syllabic | aa i e o yu oe eo a aai aau ai au ei oi ou ui iu m ng |
| syllabic-consonant | m ng |
| syllabic-vowel | aa i e o yu oe eo a aai aau ai au ei oi ou ui iu |
| voiced | aa i u e o yu oe eo a eu aai aau ai au ei oi ou eoi ui iu m n ng l w j |
| unvoiced | b d g p t k f h z c s |
| vowel | aa i u e o yu oe eo a eu aai aau ai au ei oi ou eoi ui iu |
| monophthong | aa i u e o yu oe eo a |
| diphthong | eu aai aau ai au ei oi ou eoi ui iu |
| front-diphthong | aai ai ei oi eoi ui |
| back-diphthong | eu aau au ou iu |
| rounded vowel | u o yu oe eo |
| unrounded vowel | aa i e a |
| high-vowel | i u yu |
| mid-vowel | e o oe eo |
| low-vowel | aa a |
| front-vowel | i e yu oe |
| central-vowel | eo a |
| back-vowel | aa u o |

Figure 7:
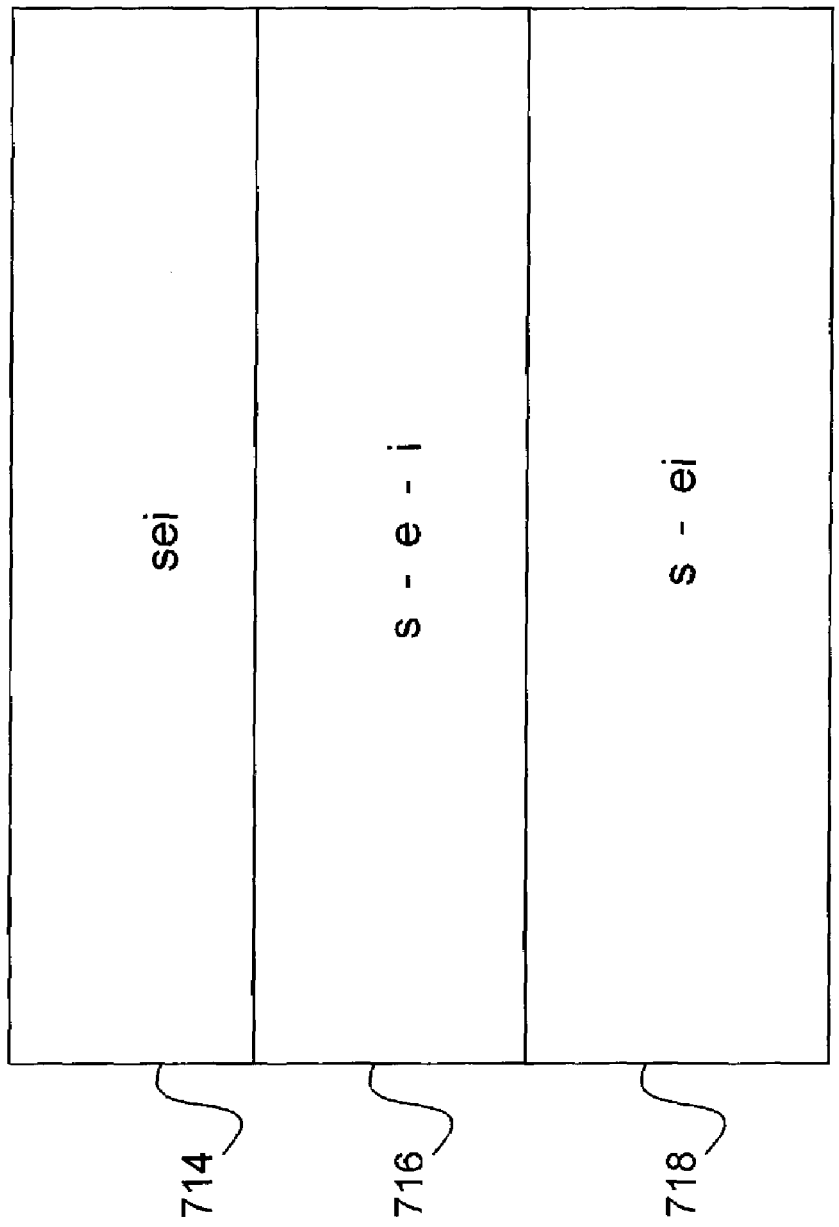
FIG. 7 is a diagram illustrating a technique for handling diphthongs, in accordance with one embodiment of the present invention.

Referring now to FIG. 7, a diagram 710 illustrating a technique for handling diphthongs is shown, in accordance with one embodiment of the present invention. In alternate embodiments, the present invention may readily handle diphthongs using various other techniques or functionalities in addition to, or instead of, those techniques or functionalities discussed in conjunction with the FIG. 7 embodiment.

In the FIG. 7 embodiment, the optimized Cantonese phone set 610 (FIG. 6) may advantageously represent diphthongs (two or more concurrent vowel sounds) by utilizing a single unified phone. For example, in the FIG. 7 embodiment, phone set 610 may include the following unified diphthong phones: eu, aai, aau, ai, au, ei, oi, ou, eoi, ui, and iu. The present invention may effectively utilize the unified diphthong phones to conserve processing and memory resources. In addition, because the vowel sounds within diphthongs in Cantonese speech occur relatively quickly, representing the diphthongs as unified phones may prevent various problems during the speech recognition process.

For purposes of illustration, in the FIG. 7 example, block 714 includes an exemplary Cantonese word "sei". In block 716, the word "sei" is represented in a conventional linguistic manner that has three separate units, "s", "e", and "i". In accordance with the present invention, in block 718, the word "sei" is efficiently represented with only two phones from phone set 610, namely "s" and "ei". In accordance with the present invention, any type of Cantonese diphthong (or other diphthongs) may be represented by utilizing unified phones, as shown in the FIG. 7 example.

Figure 8:
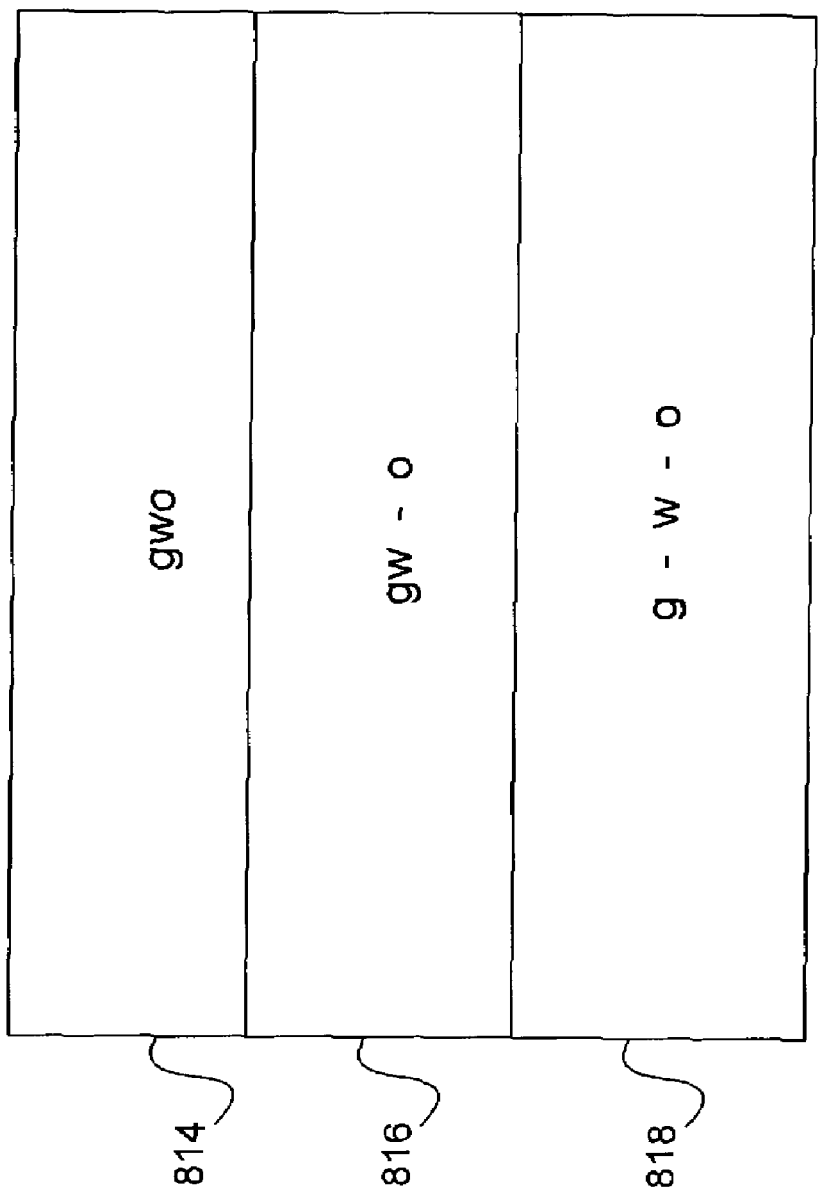
FIG. 8 is a diagram illustrating a technique for handling lip rounding, in accordance with one embodiment of the present invention.

Referring now to FIG. 8, a diagram 810 illustrating a technique for handling lip rounding is shown, in accordance with one embodiment of the present invention. In alternate embodiments, the present invention may readily handle lip rounding by using various other techniques or functionalities in addition to, or instead of, those techniques or functionalities discussed in conjunction with the FIG. 8 embodiment.

Lip rounding may include producing a "w" sound following certain consonant sounds. In the Cantonese language, the foregoing lip rounding may typically occur in conjunction with a "g" sound or with a "k" sound. Conventional phone sets may typically include both a "g" phone and a separate "gw" phone (the lip-rounded variant). In the FIG. 8 embodiment, the optimized Cantonese phone set 610 (FIG. 6) may advantageously represent lip rounding by utilizing a separate lip rounding phone "w". The present invention may effectively utilize the separate lip rounding phone "w" to provide greater accuracy during the speech recognition process.

In addition, because the phone "w" already exists in phone set 610, this technique requires no additional processing or memory resources to implement. By not representing lip rounding as a separate phone, lip rounding is thus deemed to be close enough to the "w" phone to warrant a merger of the two.

For purposes of illustration, in the FIG. 8 example, block 814 includes an exemplary Cantonese word "gwo". In block 816, the word "gwo" is represented in a conventional linguistic manner that has two separate units, "gw" and "o". In accordance with the present invention, in block 818, the word "gwo" is accurately represented with three phones from phone set 610, namely "g", "w", and "o". In accordance with the present invention, any type of Cantonese lip rounding (or other types of lip rounding) may be represented by utilizing separate phones, as shown in the FIG. 8 example.

Referring now to FIG. 9, a diagram 910 illustrating a technique for handling "stops" is shown, in accordance with one embodiment of the present invention. In alternate embodiments, the present invention may readily handle stops using various other techniques or functionalities in addition to, or instead of, those techniques or functionalities discussed in conjunction with the FIG. 9 embodiment.

In conventional linguistic practice, stops may typically be modeled to include an initial closure of the mouth, building of breath pressure, and then a release of that pressure in the form of a particular consonant sound. In the Cantonese language, stops may preferably be associated primarily with sounds corresponding to "b", "d", "g", "p", "t", and "k". In the FIG. 9 embodiment, the optimized Cantonese phone set 610 (FIG. 6) may advantageously utilize two different techniques to represent "b", "d", "g", "p", "t", and "k", depending upon the context of the corresponding sound within a phrase.

In the FIG. 9 embodiment, block 914 shows a syllable-initial context in which the stop is located at the beginning of a syllable. As shown in the FIG. 9 diagram 910, phone set 610 may utilize an appropriate consonant phone ("b", "d", "g", "p", "t", or "k") in the syllable-initial context to represent the consonant and a preceding closure. In addition, block 916 shows a syllable-final/midphrase context in which a stop is located at the end of a word in the middle of a phrase. As shown in the FIG. 9 diagram 910, phone set 610 may utilize an appropriate phone ("p", "t", or "k") in the syllable-final/midphrase context to represent the consonant and a preceding closure. Furthermore, block 918 shows a syllable-final/phrase-end context in which a stop is located at the end of a word at the end of a phrase. As shown in the FIG. 9 diagram 910, phone set 610 may effectively utilize the same identical closure phone "cl" in the syllable-final/phrase-end context to represent either "p", "t", or "k" as a closure only, without any subsequent releasing consonant sound.

The invention has been explained above with reference to preferred embodiments. Other embodiments will be apparent to those skilled in the art in light of this disclosure. For example, the present invention may readily be implemented using configurations and techniques other than those described in the preferred embodiments above. Additionally, the present invention may effectively be used in conjunction with systems other than those described above as the preferred embodiments. Therefore, these and other variations upon the preferred embodiments are intended to be covered by the present invention, which is limited only by the appended claims.

What is claimed is:

1. A system for performing a Cantonese speech recognition procedure with an electronic device, comprising:
   a recognizer configured to compare input speech data to phone strings from a vocabulary dictionary to thereby generate and output one or more recognized words from said vocabulary dictionary, said vocabulary dictionary being implemented according to an optimized phone set, said optimized phone set being implemented with a phonetic technique to separately provide consonantal phones and vocalic phones, one or more of said phone strings including more than two phones from said consonantal phones and said vocalic phones, said optimized phone set being implemented in a compact manner to include only a minimum required number of said consonantal phones and said vocalic phones, said optimized phone set representing sounds of a Cantonese language without utilizing corresponding tonal information as part of different phones in said optimized phone set, said recognizer thus performing said Cantonese speech recognition procedure without utilizing any type of tone data to thereby output said one or more recognized words as a final speech recognition result; and
   a processor configured to control said recognizer to thereby perform said Cantonese speech recognition procedure.

2. The system of claim 1 wherein said input speech data includes Cantonese language data, said optimized phone set being compactly configured to accurately represent said Cantonese language data.

3. The system of claim 1 wherein said recognizer and said processor are implemented as part of a consumer electronics device.

4. The system of claim 1 wherein said optimized phone set conserves processing resources and memory resources while performing said speech recognition procedure.

5. The system of claim 1 wherein said optimized phone set reduces training requirements for performing a recognizer training procedure to initially implement said recognizer.

6. The system of claim 1 wherein said phone strings each include a different series of phones from said optimized phone set, each of said phone strings corresponding to a different word from said vocabulary dictionary.

7. The system of claim 6 wherein said recognizer compares said input speech data to Hidden Markov Models for said phone strings from said vocabulary dictionary to thereby select said one or more recognized words during said speech recognition procedure.

8. The system of claim 1 wherein said optimized phone set includes phones b, d, g, p, t, k, m, n, ng, f, 1, h, z, c, s, w, j, cl, sil, aa, i, u, e, o, yu, oe, eo, a, eu, aai, aau, ai, au, ei, oi, ou, eoi, ui, and iu.

9. The system of claim 1 wherein said optimized phone set includes consonantal phones b, d, g, p, t,k, m, n, ng, f, 1, h, z, c, s, w, and j.

10. The system of claim 1 wherein said optimized phone set includes a closure phone "cl" and a silence phone "sil".

11. The system of claim 1 wherein said optimized phone set includes vocalic phones aa, i, u, e, o, yu, oe, eo, a, eu, aai, aau, ai, au, ei, oi, ou, eoi, ui, and iu.

12. The system of claim 1 wherein said optimized phone set represents certain diphthongs by utilizing unified diphthong phones to thereby conserve processing resources and memory resources while providing greater accuracy characteristics for said speech recognition procedure.

13. The system of claim 12 wherein said optimized phone set includes unified diphthong phones eu, aai, aau, ai, au, ei, oi, ou, eoi, ui, and iu.

14. The system of claim 1 wherein said optimized phone set represents a certain lip rounding by utilizing a separate lip rounding phone "w" after a consonantal phone "g".

15. The system of claim 1 wherein said optimized phone set represents a certain lip rounding by utilizing a separate lip rounding phone "w" after a consonantal phone "k".

16. A system for performing a Cantonese speech recognition procedure with an electronic device, comprising:
   a recognizer configured to compare input speech data to phone strings from a vocabulary dictionary to thereby generate and output one or more recognized words from said vocabulary dictionary, said vocabulary dictionary being implemented according to an optimized phone set, said optimized phone set being implemented with a phonetic technique to separately provide consonantal phones and vocalic phones, one or more of said phone strings including more than two phones from said consonantal phones and said vocalic phones, said optimized phone set being implemented in a compact manner to include only a minimum required number of said consonantal phones and said vocalic phones, said optimized phone set representing sounds of a Cantonese language without utilizing corresponding tonal information as part of different phones in said optimized phone set, said input speech data including a syllable-initial context in which a stop is located at a beginning of a syllable, said optimized phone set responsively utilizing an appropriate consonant phone "p", "t", or "k" in said syllable-initial context to represent a corresponding consonant and a preceding closure; and
   a processor configured to control said recognizer to thereby perform said Cantonese speech recognition procedure.

17. A system for performing a Cantonese speech recognition procedure with an electronic device, comprising:
   a recognizer configured to compare input speech data to phone strings from a vocabulary dictionary to thereby generate and output one or more recognized words from said vocabulary dictionary, said vocabulary dictionary being implemented according to an optimized phone set, said optimized phone set being implemented with a phonetic technique to separately provide consonantal phones and vocalic phones, one or more of said phone strings including more than two phones from said consonantal phones and said vocalic phones, said optimized phone set being implemented in a compact manner to include only a minimum required number of said consonantal phones and said vocalic phones, said optimized phone set representing sounds of a Cantonese language without utilizing corresponding tonal information as part of different phones in said optimized phone set, said input speech data including a syllable-final/midphrase context in which a stop is located at an end of a word in a middle of a phrase, said optimized phone set responsively utilizing an appropriate consonant phone "P", "t", or "k" in said syllable-final/midphrase context to represent a corresponding consonant and a preceding closure; and a processor configured to control said recognizer to thereby perform said Cantonese speech recognition procedure.

18. A system for performing a Cantonese speech recognition procedure with an electronic device, comprising:
a recognizer configured to compare input speech data to phone strings from a vocabulary dictionary to thereby generate and output one or more recognized words from said vocabulary dictionary, said vocabulary dictionary being implemented according to an optimized phone set, said optimized phone set being implemented with a phonetic technique to separately provide consonantal phones and vocalic phones, one or more of said phone strings including more than two phones from said consonantal phones and said vocalic phones, said optimized phone set being implemented in a compact manner to include only a minimum required number of said consonantal phones and said vocalic phones, said optimized phone set representing sounds of a Cantonese language without utilizing corresponding tonal information as part of different phones in said optimized phone set, said input speech data including a syllable-final/phrase-end context in which a stop is located at an end of a word at an end of a phrase, said optimized phone set responsively utilizing a same identical closure phone "cl" in said syllable-final/phrase-end context to represent either "p", "t", or "k" consonants as a closure only without any subsequent releasing consonant sound; and
a processor configured to control said recognizer to thereby perform said Cantonese speech recognition procedure.

19. A system for performing a Cantonese speech recognition procedure with an electronic device, comprising:
a recognizer configured to compare input speech data to phone strings from a vocabulary dictionary to thereby generate and output one or more recognized words from said vocabulary dictionary, said vocabulary dictionary being implemented according to an optimized phone set, said optimized phone set being implemented with a phonetic technique to separately provide consonantal phones and vocalic phones, one or more of said phone strings including more than two phones from said consonantal phones and said vocalic phones, said optimized phone set being implemented in a compact manner to include only a minimum required number of said consonantal phones and said vocalic phones, said optimized phone set representing sounds of a Cantonese language without utilizing corresponding tonal information as part of different phones in said optimized phone set, said input speech data including a syllable-initial context in which a first stop is located at a beginning of a syllable, a syllable-final/midphrase context in which a second stop is located at an end of a first word in a middle of a phrase, and a syllable-final/phrase-end context in which a third stop is located at an end of a second word at an end of said phrase, said optimized phone set utilizing an appropriate consonant phone "b", "d", "p", "t", or "k" in said syllable-initial context to represent a corresponding consonant and a preceding closure, said optimized phone set responsively utilizing said appropriate consonant phone "p", "t", or "k" in said syllable-final/midphrase context to represent said corresponding consonant and said preceding closure, said optimized phone set responsively utilizing a same identical closure phone "cl" in said syllable-final/phrase-end context to represent either "p", "t", or "k" as a closure only without any subsequent releasing consonant and
a processor configured to control said recognizer to thereby perform said Cantonese speech recognition procedure.

20. The system of claim 1 wherein said consonantal phones and said vocalic phones from said optimized phone set are combined to represent syllables from a Cantonese language system.

21. A method for performing a Cantonese speech recognition procedure with an electronic device, comprising the steps of:
configuring a recognizer to compare input speech data to phone strings from a vocabulary dictionary to thereby generate and output one or more recognized words from said vocabulary dictionary, said vocabulary dictionary being implemented according to an optimized phone set, said optimized phone set being implemented with a phonetic technique to separately provide consonantal phones and vocalic phones, one or more of said phone strings including more than two phones from said consonantal phones and said vocalic phones, said optimized phone set being implemented in a compact manner to include only a minimum required number of said consonantal phones and said vocalic phones, said optimized phone set representing sounds of a Cantonese language without utilizing corresponding tonal information as part of different phones in said optimized phone set, said recognizer thus performing said Cantonese speech recognition procedure without utilizing any type of tone data to thereby output said one or more recognized words as a final speech recognition result; and
controlling said recognizer with a processor to thereby perform said Cantonese speech recognition procedure.

22. The method of claim 21 wherein said input speech data includes Cantonese language data, said optimized phone set being compactly configured to accurately represent said Cantonese language data.

23. The method of claim 21 wherein said recognizer and said processor are implemented as part of a consumer electronics device.

24. The method of claim 21 wherein said optimized phone set conserves processing resources and memory resources while performing said speech recognition procedure.

25. The method of claim 21 wherein said optimized phone set reduces training requirements for performing a recognizer training procedure to initially implement said recognizer.

26. The method of claim 21 wherein said phone strings each include a different series of phones from said optimized phone set, each of said phone strings corresponding to a different word from said vocabulary dictionary.

27. The method of claim 26 wherein said recognizer compares said input speech data to Hidden Markov Models for said phone strings from said vocabulary dictionary to thereby select said one or more recognized words during said speech recognition procedure.

28. The method of claim 21 wherein said optimized phone set includes phones b, d, g, p, t, k, m, n, ng, f, l, h, z, c, s, w, j, cl, sil, aa, i, u, e, o, yu, oe, eo, a, eu, aai, aau, ai, au, ei, oi, ou, eoi, ui, and iu.

29. The method of claim 21 wherein said optimized phone set includes consonantal phones b, d, g, p, t, k, m, n, ng, f, l, h, z, c, s, w, and j.

30. The method of claim 21 wherein said optimized phone set includes a closure phone "cl" and a silence phone "sil".

31. The method of claim 21 wherein said optimized phone set includes vocalic phones aa, i, u, e, o, yu, oe, eo, a, eu, aai, aau, ai, au, ei, oi, ou, eoi, ui, and iu.

32. The method of claim 21 wherein said optimized phone set represents certain diphthongs by utilizing unified diphthong phones to thereby conserve processing resources and memory resources while providing greater accuracy characteristics for said speech recognition procedure.

33. The method of claim 32 wherein said optimized phone set includes unified diphthong phones eu, aai, aau, ai, au, ei, oi, ou, eoi, ui, and iu.

34. The method of claim 21 wherein said optimized phone set represents a certain lip rounding by utilizing a separate lip rounding phone "w" after a consonantal phone "g".

35. The method of claim 21 wherein said optimized phone set represents a certain lip rounding by utilizing a separate lip rounding phone "w" after a consonantal phone "k".

36. A method for performing a Cantonese speech recognition procedure with an electronic device, comprising the steps of:
configuring a recognizer to compare input speech data to phone strings from a vocabulary dictionary to thereby generate and output one or more recognized words from said vocabulary dictionary, said vocabulary dictionary being implemented according to an optimized phone set, said optimized phone set being implemented with a phonetic technique to separately provide consonantal phones and vocalic phones, one or more of said phone strings including more than two phones from said consonantal phones and said vocalic phones, said optimized phone set being implemented in a compact manner to include only a minimum required number of said consonantal phones and said vocalic phones, said optimized phone set representing sounds of a Cantonese language without utilizing corresponding tonal information as part of different phones in said optimized phone set, said input speech data including a syllable-initial context in which a stop is located at a beginning of a syllable, said optimized phone set responsively utilizing an appropriate consonant phone "b", "d", "g", "p", "t", or "k" in said syllable-initial context to represent a corresponding consonant and a preceding closure; and
controlling said recognizer with a processor to thereby perform said Cantonese speech recognition procedure.

37. A method for performing a Cantonese speech recognition procedure with an electronic device. comprising the steps of:
configuring a recognizer to compare input speech data to phone strings from a vocabulary dictionary to thereby generate and output one or more recognized words from said vocabulary dictionary, said vocabulary dictionary being implemented according to an optimized phone set, said optimized phone set being implemented with a phonetic technique to separately provide consonantal phones and vocalic phones, one or more of said phone strings including more than two phones from said consonantal phones and said vocalic phones, said optimized phone set being implemented in a compact manner to include only a minimum required number of said consonantal phones and said vocalic phones, said optimized phone set representing sounds of a Cantonese language without utilizing corresponding tonal information as part of different phones in said optimized phone set, said input speech data including a syllable-final/midphrase context in which a stop is located at an end of a word in a middle of a phrase, said optimized phone set responsively utilizing an appropriate consonant phone "p", "t", or "k" in said syllable-final/midphrase context to represent a corresponding consonant and a preceding; and
controlling said recognizer with a processor to thereby perform said Cantonese speech recognition procedure.

38. A method for performing a Cantonese speech recognition procedure with an electronic device, comprising the steps of:
configuring a recognizer to compare input speech data to phone strings from a vocabulary dictionary to thereby generate and output one or more recognized words from said vocabulary dictionary, said vocabulary dictionary being implemented according to an optimized phone set, said optimized phone set being implemented with a phonetic technique to separately provide consonantal phones and vocalic phones, one or more of said phone strings including more than two phones from said consonantal phones and said vocalic phones, said optimized phone set being implemented in a compact manner to include only a minimum required number of said consonantal phones and said vocalic phones, said optimized phone set representing sounds of a Cantonese language without utilizing corresponding tonal information as part of different phones in said optimized phone set, said input speech data including a syllable-final/phrase-end context in which a stop is located at an end of a word at an end of a phrase, said optimized phone set responsively utilizing a same identical closure phone "cl" in said syllable-final/phrase-end context to represent either "p", "t", or "k" as a closure only without any subsequent releasing consonant sound; and
controlling said recognize with a processor to thereby perform said Cantonese speech recognition procedure.

39. A method for performing a Cantonese speech recognition procedure with an electronic device, comprising the steps of:
configuring a recognizer to compare input speech data to phone strings from a vocabulary dictionary to thereby generate and output one or more recognized words from said vocabulary dictionary, said vocabulary dictionary being implemented according to an optimized phone set, said optimized phone set being implemented with a phonetic technique to separately provide consonantal phones and vocalic phones, one or more of said phone strings including more than two phones from said consonantal phones and said vocalic phones, said optimized phone set being implemented in a compact manner to include only a minimum required number of said consonantal phones and said vocalic phones, said optimized phone set representing sounds of a Cantonese language without utilizing corresponding tonal information as part of different phones in said optimized phone set, said input speech data including a syllable-initial context in which a first stop is located at a beginning of a syllable, a syllable-final/midphrase context in which a second stop is located at an end of a first word in a middle of a phrase, and a syllable-final/phrase-end context in which a third stop is located at an end of a second word at an end of said phrase, said optimized phone set utilizing an appropriate consonant phone "b", "d", "g", "p", "t", or "k" in said syllable-initial context to represent a corresponding consonant and a preceding closure, said optimized phone set responsively utilizing an appropriate consonant phone "p", "t", or "k" in said syllable-final/midphrase context to represent said corresponding consonant and a preceding closure, said optimized phone set responsively utilizing a same identical closure phone "cl" in said syllable-final/phrase-end context to represent either "p", "t", or "k" as a closure only without any subsequent releasing consonant sound; and controlling said recognizer with a processor to thereby perform said Cantonese speech recognition procedure.

40. The method of claim 21 wherein said consonantal phones and said vocalic phones from said optimized phone set are combined to represent syllables from a Cantonese language system.

41. A computer-readable medium encoded with a computer program for performing a Cantonese speech recognition procedure, by performing the steps of:

configuring a recognizer to compare input speech data to phone strings from a vocabulary dictionary to thereby generate and output one or more recognized words from said vocabulary dictionary, said vocabulary dictionary being implemented according to an optimized phone set, said optimized phone set being implemented with a phonetic technique to separately provide consonantal phones and vocalic phones, one or more of said phone strings including more than two phones from said consonantal phones and said vocalic phones, said optimized phone set being implemented in a compact manner to include only a minimum required number of said consonantal phones and said vocalic phones, said optimized phone set representing sounds of a Cantonese language without utilizing corresponding tonal information as part of different phones in said optimized phone set, said recognizer thus performing said Cantonese speech recognition procedure without utilizing any type of tone data to thereby output said one or more recognized words as a final speech recognition result; and controlling said recognizer with a processor to thereby perform said Cantonese speech recognition procedure.

42. A system for performing a Cantonese speech recognition procedure with an electronic device, comprising the steps of:

means for comparing input speech data to phone strings from a vocabulary dictionary to thereby generate and output one or more recognized words from said vocabulary dictionary, said vocabulary dictionary being implemented according to an optimized phone set, said optimized phone set being implemented with a phonetic technique to separately provide consonantal phones and vocalic phones, one or more of said phone strings including more than two phones from said consonantal phones and said vocalic phones, said optimized phone set being implemented in a compact manner to include only a minimum required number of said consonantal, phones and said vocalic phones, said optimized phone set representing sounds of a Cantonese language without utilizing corresponding tonal information as part of different phones in said optimized phone set, said means for comparing thus performing said Cantonese speech recognition procedure without utilizing any type of tone data to thereby output said one or more recognized words as a final speech recognition result; and means for controlling said means for comparing to thereby perform said Cantonese speech recognition procedure.

43. The system of claim 1 wherein said optimized phone set includes only phones b, d, g, p, t, k, m, n, ng, f, l, h, z, c, s, w, j, cl, sil, aa, i, u, e, o, yu, oe, eo, a, eu, aai, aau, ai, au, ei, oi, ou, eoi, ui, and iu.

* * * * *